W. WEAVER,

Assignor, by mesne assignments, to H. W. LADD.

Bed-Bottom.

No. 8,552. Reissued Jan. 21, 1879.

*Witnesses:*

A. Mahon

Alex^r A. C. Klaneke

*Inventor:*

William Weaver.

N. PETERS, PHOTO-LITHOGRAPHER, WASHINGTON, D. C.

UNITED STATES PATENT OFFICE.

WILLIAM WEAVER, OF PHŒNIXVILLE, PA., ASSIGNOR, BY MESNE ASSIGNMENTS, TO HERMON W. LADD, OF CHELSEA, MASS.

IMPROVEMENT IN BED-BOTTOMS.

Specification forming part of Letters Patent No. 61,901, dated February 5, 1867; Reissue No. 8,552, dated January 21, 1879; application filed May 4, 1878.

*To all whom it may concern:*

Be it known that I, WILLIAM WEAVER, of Phœnixville, Chester county, Pennsylvania, have invented certain Improvements in Spring Bed-Bottoms; and that the same are fully described in the following specification and represented in the accompanying drawings.

Figure 1:
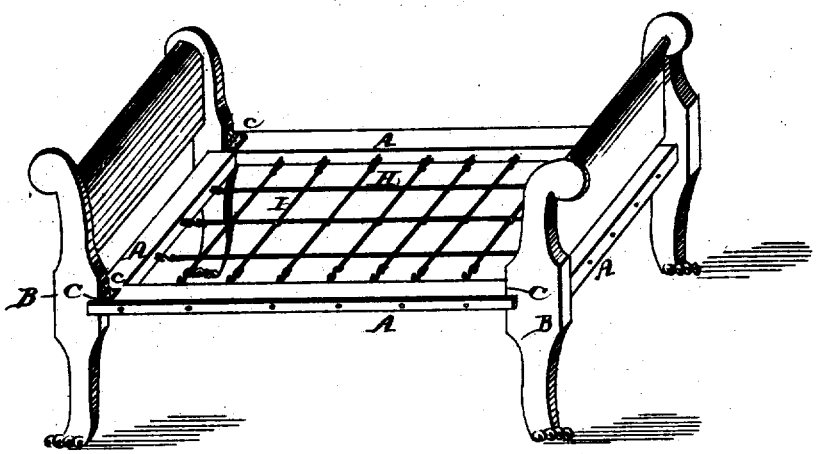
Figure 3:
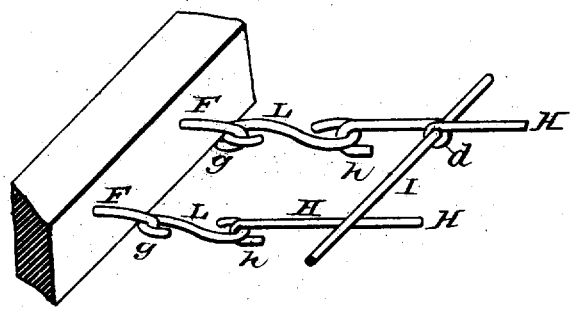
Figure 2:
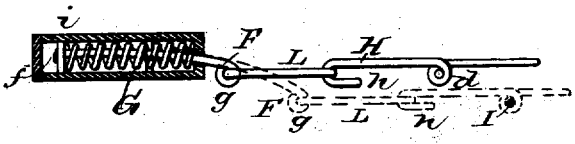

Figure 1 shows, in perspective, a bed-bottom embodying my improvements. Fig. 2 shows one of the supporting-springs and its relation to the wire fabric of the bed-bottom. Fig. 3 illustrates the hook-connection of the several parts of the bed-bottom.

My invention consists in the combination of a jointed metallic fabric, composed of hooked or looped rods and links, with a series of horizontally-acting spiral springs, which support the bed-bottom and connect it with the bed-frame.

My invention also consists in such metallic fabric and springs when their several loops or hook-connections are turned downward for the purposes herein described.

My invention also consists in such metallic fabric and springs, in combination with a folding supporting-frame.

The description will be confined to the specific apparatus shown in the drawings, leaving any desired modifications to the skill of the constructer.

In the drawings, A represents the frame or rails of the bedstead, and B its legs, which parts may, if desired, be hinged together at the points C, so as to fold compactly.

The bed-bottom is composed of the interlocking wires and links F L H I, which together form a flexible and elastic metallic fabric upon which the bedding may rest.

G G are the supporting-springs, arranged horizontally and at suitable distances from each other, and so secured to the bed bottom and frame that the former shall be entirely suspended from the latter, and the elasticity of the springs shall be imparted to the bed placed upon the wire fabric.

The springs have thus the two functions of suspending the bed-bottom and holding it under constant tension, since they continually tend to draw the lines of links which they support toward the points of suspension. Hence the importance of employing in my bed-bottom a material capable of permanently withstanding the powerful strain of the horizontally-acting springs, and not liable to stretch or sag with slight use or by reason of atmospheric changes. This permanence of shape and position of the supporting fabric is particularly important in folding beds or couches, where economy of space is a vital consideration. The flat metallic fabric which I employ is therefore peculiarly adapted to my purpose. It has the advantage, also, of being perfectly non-absorbing, and affords no harbors for vermin—qualities of great value in beds for hospitals or public houses.

In addition to the advantages of the use of wire for bed-bottoms generally, I obtain the best results by my improvement in jointing or linking together a series of wires so that the opposite springs of any given pair are connected by a chain or series of links instead of a single continuous wire, and these chains are united transversely by wire connections of a similar character. This construction gives to the fabric a degree of flexibility not attainable by any other means.

The manner of connecting the several parts shown in Fig. 2 may be briefly described: The springs G are placed in holes bored nearly through the rails, so as to leave sufficient wood between the base of the hole and the inner side of the frame to form a strong bearing for the inner end of the spring. Through the center of this bearing a bent wire, F, projects, and is furnished with a hook, *g*, to connect with the outer links of the bed-bottom. The other end of the wire F is connected to the spring by a washer, *i*, and button *f*, so that the several springs, connected from end to end of the frame by the interlocked wires F L H I, shall yield horizontally to vertical pressure applied upon the wire fabric suspended from the springs. When the springs are thus placed in holes formed in the rails they may be completely inclosed and hidden by securing a strip, I, of suitable material over the series of holes to exclude dust and moisture.

Each of the wires H is curved downward for the purpose of dividing the strain and permitting it to yield freely in its movements when the spring is compressed, and also for the purpose of keeping the loops or hooks *h* turned downward where they engage with the links L of the fabric, so that the hook ends cannot catch into and tear the ticking of the mattress. The points of the hooks *g*, which join the wires F to the links L, turn downward in like manner, as do also the loops *d*, which unite the intersecting wires H I to each other, and for a similar reason.

The looping together of the wires H I where they intersect serves to hold them laterally in their positions, since the several parallel wires are thus prevented from approaching too closely or separating too widely.

The links L perform an important service in my bed-bottom. They give it flexibility, and thereby prevent the breaking of the various wires composing the fabric, since there would be great additional strain if, instead of the series of interlocked wires and links, the springs were directly connected across the frame by continuous wires.

I do not limit myself to any particular number of these supporting-wires, for I propose to use more or less of each, as circumstances may require.

I am aware that bed-bottoms have heretofore been made of continuous textile cords, webbing, and sacking, suspended from the surrounding frame. I disclaim all such materials as liable to stretch, subject to climatic changes, and entirely foreign to my invention, for the reasons stated.

I claim as my invention—

1. The combination of a supporting-frame and a series of suspension-springs with a bed-bottom composed of a series of longitudinal and transverse wires and links, interlocked to form continuous chains lengthwise and crosswise, and all united into a metallic fabric suspended wholly by said frame and springs, substantially as set forth.

2. The combination of a supporting-frame and a series of spiral suspension-springs with a jointed metallic fabric composed of a series of longitudinal links transversely connected together, and wholly suspended by said frame and springs, for the purpose set forth.

3. The combination, with a bed-frame and a series of spiral springs connected therewith, of a bed-bottom composed of a fabric of wire rods and links wholly supported by said springs, and having the hooked or looped ends turned downward, substantially as set forth.

4. As a new article of manufacture, a bedstead or couch having legs or frame-supports hinged or so connected thereto that they may be folded, and provided with a supporting metallic spring fabric suspended from its edges, substantially as and for the purpose stated.

WILLIAM WEAVER.

Witnesses:

JOHN A. WIEDERSHEIM,
H. G. GARSED.